United States Patent [19]

Matsuda et al.

[11] 4,424,520

[45] Jan. 3, 1984

[54] INK JET PRINTING APPARATUS

[75] Inventors: Yasumasa Matsuda, Hitachi; Syoji Sagae, Hitachiota; Masatoshi Kasahara, Hitachi, all of Japan

[73] Assignees: Hitachi, Ltd.; Hitachi Koki Co., Ltd., both of Tokyo, Japan

[21] Appl. No.: 311,887

[22] Filed: Oct. 15, 1981

[30] Foreign Application Priority Data

Oct. 15, 1980 [JP] Japan .............................. 55-142991

Jan. 7, 1981 [JP] Japan .............................. 56-420

[51] Int. Cl.³ .............................. G01D 15/18

[52] U.S. Cl. .............................. 346/140 R

[58] Field of Search .............................. 346/140 PD

[56] References Cited

U.S. PATENT DOCUMENTS 4,112,433 9/1978 Vernon .................... 346/140 PD X

*Primary Examiner*—George H. Miller, Jr.

*Attorney, Agent, or Firm*—Antonelli, Terry & Wands

[57] ABSTRACT

An ink jet printing apparatus comprises a nozzle head including, orifices for ejecting ink particles, pressure chambers each having a piezoelectric element for applying a pressure wave to ink in the chamber and each communicating with corresponding one of the orifices and an ink chamber communicating with the pressure chambers, and electrical signal applying device for applying an electrical signal to selected one or ones of the piezoelectric elements to produce the pressure waves. The electrical signal applying device applies a main electrical signal pulse to the selected one or ones of the piezoelectric elements for inducing rises of the pressure waves and applies a sub-electrical signal pulse for suppressing the pulsations of the pressure waves a predetermined time interval after the main electrical signal.

7 Claims, 10 Drawing Figures

INK JET PRINTING APPARATUS

The present invention relates to an ink jet printing apparatus, and more particularly to an ink jet printing apparatus in which an internal volume of an ink chamber formed in a nozzle head is varied to eject ink particles from an orifice.

The ink jet printing apparatus of this type is known, as disclosed, for example, in U.S. Pat. No. 4,216,477 to Matsuda et al issued on Aug. 5, 1980, as an impulse jet system which comprises an ink chamber having one end communicated with an ink tank and the other end communicated with an orifice for ejecting ink particles to form a pressure chamber, and a nozzle head having an electromechanical transducer such as a piezoelectric crystal or element which forms a portion of a wall of the ink chamber and abruptly reduces a volume of the ink chamber upon application of an electrical pulse signal so that the volume of the ink chamber is varied by the electrical signal applied to the piezoelectric element crystal or to eject the ink in the ink chamber from the orifice one ink particle at a time in synchronism with the electrical signal to record a desired pattern on a recording paper.

In the impulse jet system, one ink particle is ejected from the orifice for each electrical signal applied to the piezoelectric element. Accordingly, a recording speed of the impulse jet system is lower than other systems but it has been recognized as a simple type recording apparatus because the structure of the nozzle head is simple and neither means for recovering unused ink particles nor control means for the ink particles is required.

In this type of printing apparatus, since the ink particles are ejected from the orifice by abruptly reducing the internal volume of the ink chamber by applying the electrical signal to the piezoelectric element mounted in the ink chamber, various problems may arise in the selection of a waveform, a pulse width, an amplitude (voltage) and a frequency of the electrical pulse signal.

The pulse waveform is preferably a square wave from the standpoint of abruptly reducing the internal volume of the ink chamber, and more preferably it has a sharp rise. In an experiment, it has been found that the rise dV/dt is preferably larger than $2.5\times10^8$ volts/second.

It will be readily understood that the pulse width is preferably within a predetermined range in order to produce an ideal ink particle. In an experiment, it has been found that the pulse width is preferably within a range of 20-80 microseconds.

It has also been found that the magnitude (voltage) of the electrical pulse signal may give a significant effect on the formation of the ink particle. When the voltage of the electrical pulse signal is too low, a pressure pulse large enough to overcome a surface tension of liquid in the orifice can not be produced and hence no ink particle is ejected. A minimum voltage necessary for the formation of a proper ink particle is referred to as a threshold voltage hereinafter. When an electrical pulse signal larger than the threshold voltage is applied, the size of the ink particle ejected from the orifice and its flying speed increase in proportion to the voltage. However, if the voltage of the electrical pulse signal increases beyond a certain critical value, the proper ink particle formation can not be attained, so that a large ink particle together with a very fine ink particle are formed or the large ink particle is not formed but only a plurality of small ink particles are formed. The upper limit of the voltage which allows the proper ink particle formation is referred to as a proper particle formation limit voltage.

The relationship between the frequency of the electrical pulse signal applied to the piezoelectric element and each of the threshold voltage and the proper particle formation limit voltage becomes also a problem while it is not critical when the ink particles are ejected only around a particular frequency (e.g. 1000 Hz), a usual printing apparatus is driven at any desired frequency and hence it is required that the ink particles are properly ejected over a wide frequency range. In such a printing apparatus, it is preferable in the design of an electric drive circuit that the threshold voltage and the proper particle formation limit voltage are substantially constant over a wide frequency range and the former is as low as possible.

Considering first the frequency characteristic of the threshold voltage, in the prior art apparatus, the variation of the threshold voltage increases with the increase of the frequency, and in order to form the ink particle having a uniform size and a uniform velocity over a wide frequency range, the magnitude of the electrical pulse has to be adjusted for each frequency used. Accordingly, the circuit configuration is complex and expensive, or the use of the apparatus at a high frequency has to be given up.

It has been found that, while the frequency characteristic of the threshold voltage of the prior art nozzle head of the type described above is affected by a mechanical resonance of the nozzle head, a part of the variation of the frequency characteristic of the threshold voltage can not be improved even if the mechanical resonance point is varied, that is, there exists a variation factor other than the mechanical resonance.

This variation factor is inherent to the nozzle head and it has been found by an experiment that it is caused by the fact that the pulsation of the pressure due to a fluidic resonance of the ink in the nozzle head renders the pressure change produced in the ink chamber by the electrical signal applied to the piezoelectric element to be frequency-dependent.

It has also been found that regarding the fluidic resonance per se in the fluid path in the nozzle head, the pulsation of the pressure in the ink chamber when the phase of the pressure wave which has emanated from the ink chamber, reached the orifice at the tip end of the nozzle head and reflected back to the ink chamber and the phase of the pressure change due to the deformation of the piezoelectric element in the ink chamber are in phase with each other, directly affects the formation of the ink particle even if the resonance frequency is much higher than the drive frequency.

Furthermore, not only the frequency characteristic of the threshold voltage but also the frequency characteristic of the proper particle formation limit voltage is critical. While the proper particle formation limit voltage also varies over a wide frequency range, it does not necessarily vary with the variation of the threshold voltage but both the voltages may be very close to each other at a certain frequency or the threshold voltage may so rise at another frequency that it becomes equal to the proper particle formation limit voltage. The frequency at which the threshold voltage abnormally rises is a frequency limit. In the prior art, a response frequency range has been set such that the maximum threshold voltage does not exceed the minimum level of the proper particle formation limit voltage. If the frequency limit is low, the print speed of the ink jet printer is necessarily low. Accordingly, in order to improve the performance of the ink jet printing apparatus, it has been desired to raise the frequency limit to broden the response frequency range.

It is, therefore, an object of the present invention to provide an ink jet printing apparatus which overcomes the difficulties described above relating to the electrical pulse signal applied to the piezoelectric element.

It is another object of the present invention to provide a high performance ink jet printing apparatus capable of forming substantially uniform ink particles over a wide frequency range.

It is a further object of the present invention to provide an ink jet printing apparatus which cancels out a pulsation of a pressure of ink in an ink chamber of a nozzle head due to a reflected wave to reduce the effect of the pulsation of the pressure to the ink particle.

It is a further object of the present invention to provide an ink jet printing apparatus which suppresses the variation of the threshold voltage with respect to the frequency characteristic of the nozzle head and reduces the threshold voltage to improve the controlability of the apparatus.

It is still further object of the present invention to provide an ink jet printing apparatus having a high printing speed.

The above and other objects and features of the present invention will be apparent from the following description taken in conjunction with the accompanying drawings, in which.

Figure 1:
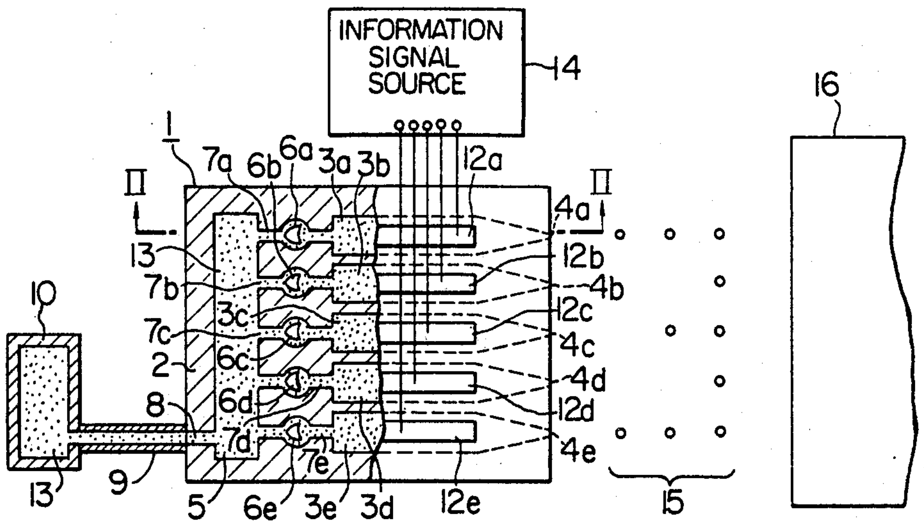
FIG. 1 is a plan view, partly cut away, of a nozzle head in one embodiment of the present invention.
Figure 3:
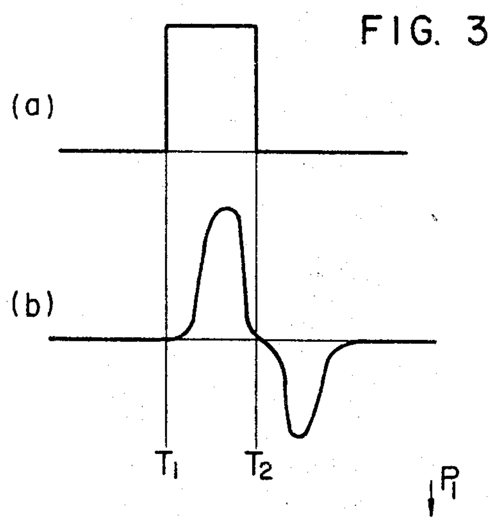
Figure 4:
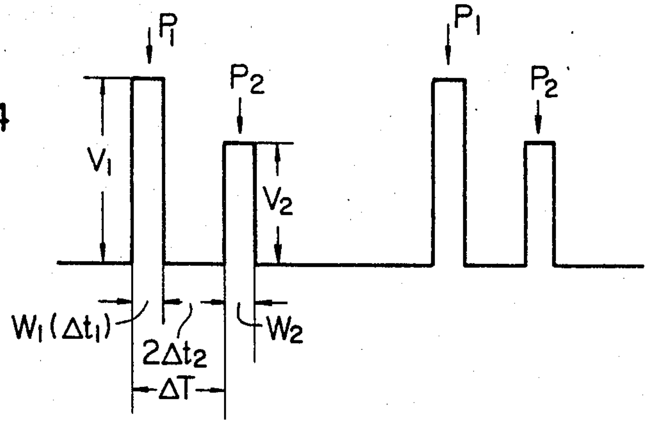
Figure 5:
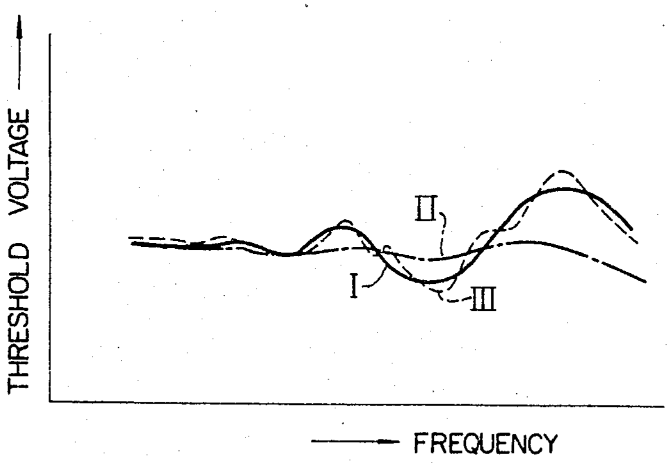
Figure 6:
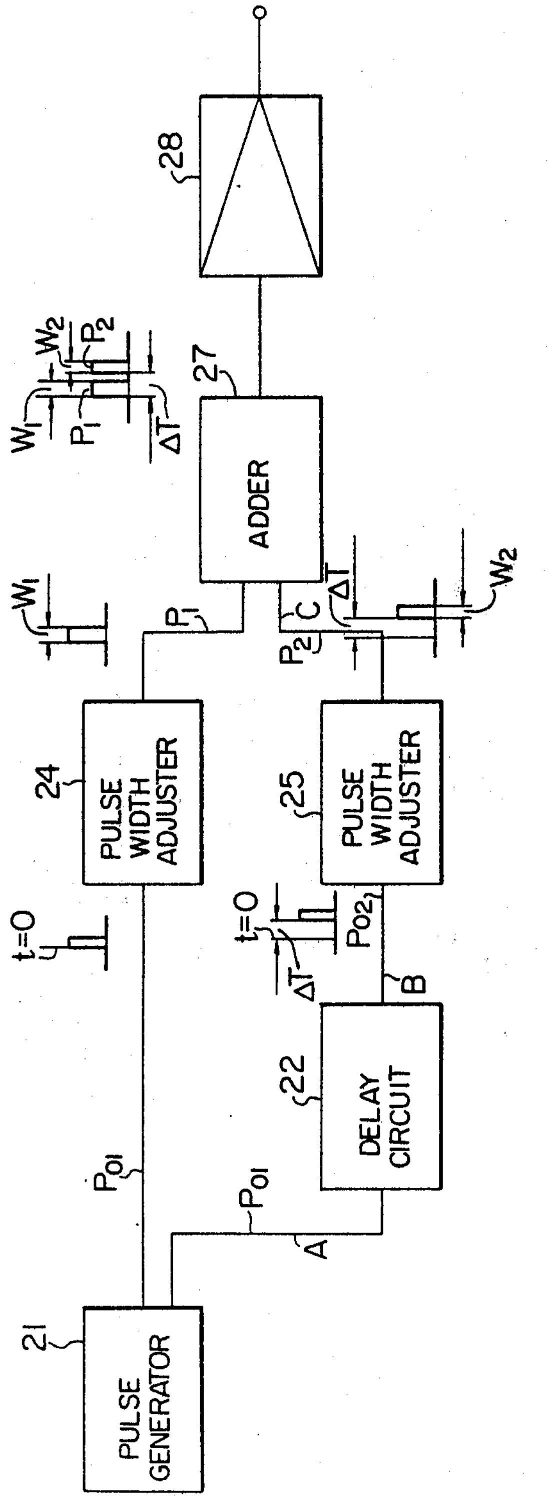
Figure 7:
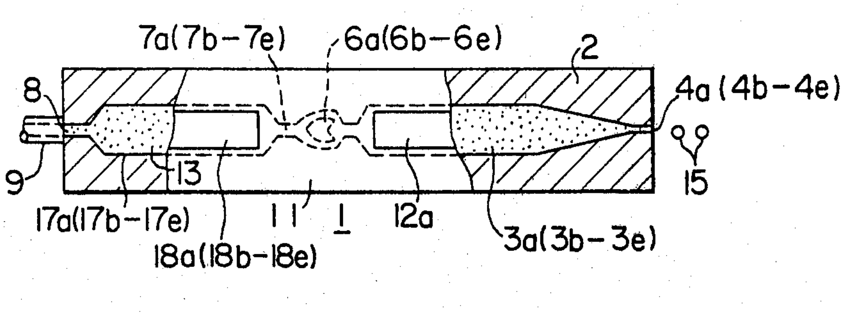
Figure 9:
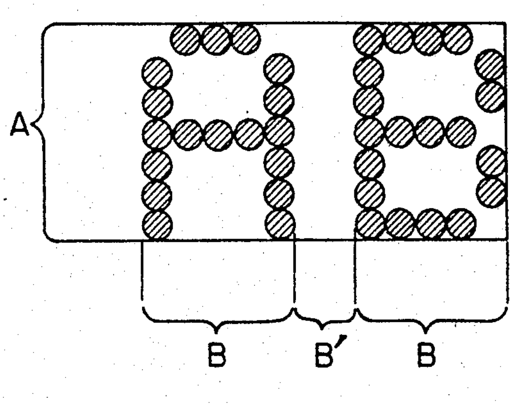
Figure 10:
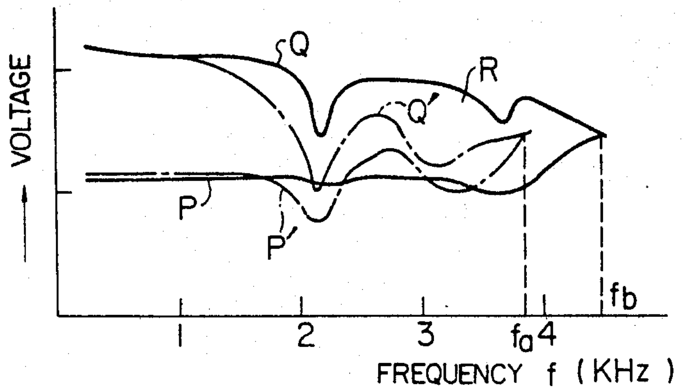
Figure 8:
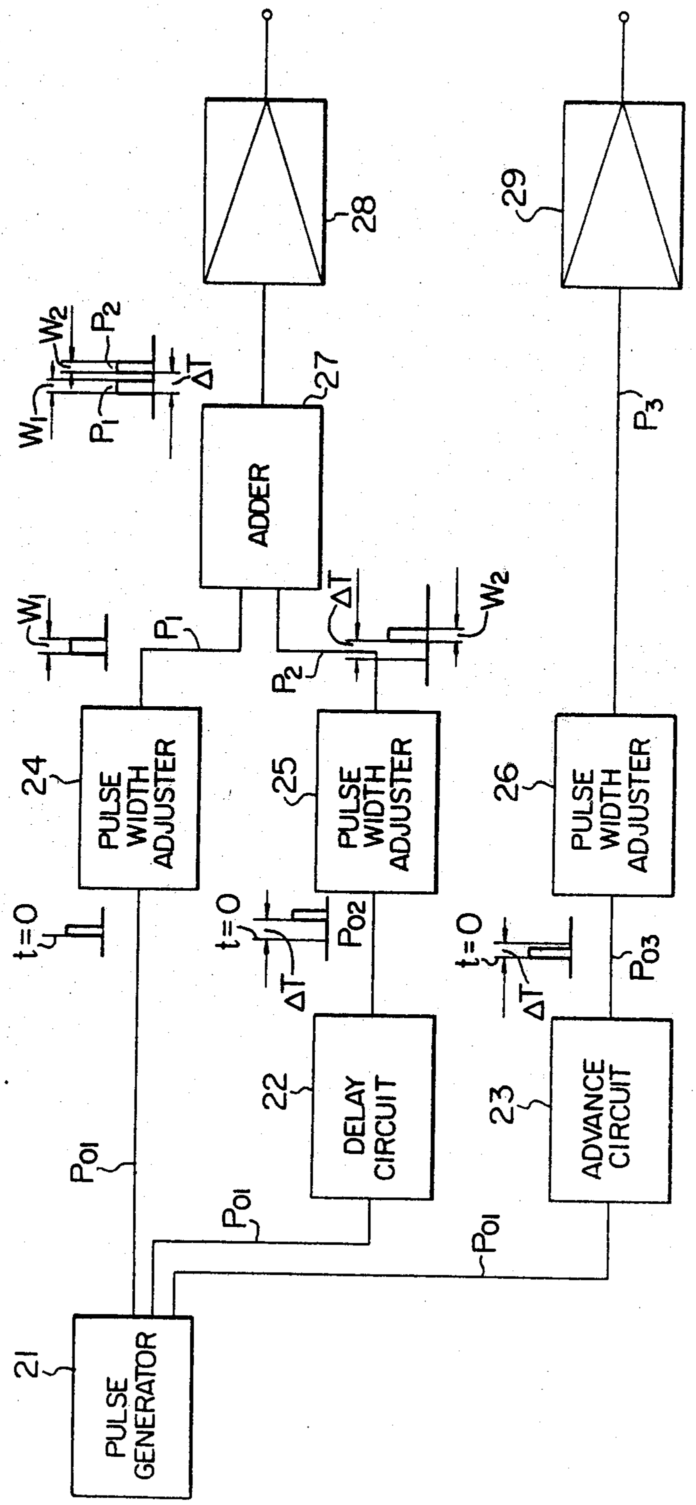

FIG. 3 diagramatically shows an electrical pulse signal and a pressure change in an ink chamber;

FIG. 4 shows a waveform of a pair of main and subpulses used to drive a piezoelectric element in an embodiment of the present invention;

FIG. 5 shows frequency characteristics of the threshold voltage in various cases;

FIG. 6 is a block diagram of an information signal source circuit for driving the nozzle head shown in FIG. 1;

FIG. 7 is a plan view, partly cut away, of a nozzle head in another embodiment of the present invention;

FIG. 8 is a block diagram of an information signal source circuit for driving the nozzle head shown in FIG. 7;

FIG. 9 shows an example of characters printed by a print head according to the present invention; and FIG. 10 is a diagram illustrating a relationship between the driving frequency for the print head and each of the threshold voltage and the proper particle formation limit voltage.

The preferred embodiments of the ink jet printing apparatus according to the present invention will now be described in detail with reference to the accompanying drawings.

FIG. 1 is a plan view, partly cut away, of a nozzle head in one embodiment of the present invention. A substrate 2 of a nozzle head generally designated by 1 has five ink chambers 3_a_-3_e_ which form independent pressure chambers, orifices 4_a_-4_e_ communicating with respective end surfaces of the ink chambers 3_a_-3_e_, a common ink chamber 5 and fluid path grooves 7_a_-7_e_ extending between the common ink chamber 5 and the respective ink chambers 3_a_-3_e_ and having fluidic diodes 6_a_-6_e_, respectively.

The common ink chamber 5 communicates with an ink tank 10 through an ink supply aperture 8 and a pipe 9.

Figure 2:
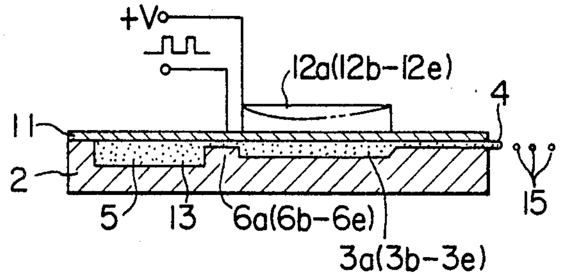
FIG. 2 is a sectional view taken along a line II—II in FIG. 1.

An upper cover 11 is joined to the substrate 2 thus constructed, as shown in FIG. 2, and piezoelectric elements 12_a_-12_e_ are fixedly bonded to the upper surface of the upper cover 11 at positions corresponding to the ink chambers 3_a_-3_e_, respectively.

Ink 13 in the ink tank 10 is supplied to the ink chambers 3_a_-3_e_ through the ink supply aperture 8, the common ink chamber 5, and the fluidic diodes 6_a_-6_e_ and it is filled up to the orifices 4_a_-4_e_ which are connected to the ink chambers 3_a_-3_e_, respectively.

When an electrical signal is applied from an information signal source 14 to selected one or ones of the piezoelectric elements 12_a_-12_e_ in a polarity to cause internal volumes of corresponding one or ones of the ink chambers 3_a_-3_e_ to be reduced, the pressures in the corresponding one or ones of the ink chambers 3_a_-3_e_ rise so that ink particles 15 are ejected from the corresponding one or ones of the orifices 4_a_-4_e_ toward a record medium 16.

The fluidic diodes 6_a_-6_e_ formed in the fluid path grooves 7_a_-7_e_ between the common ink chamber 5 and the separate ink chambers 3_a_-3_e_ function to minimize the propagation of the pressures of the ink 13 produced in the corresponding one or ones of the ink chambers 3_a_-3_e_ to the common ink chamber 5 so as to maximize the propagation of the pressures to the corresponding one or ones of the orifices 4_a_-4_e_.

In the ink jet printing apparatus thus constructed, the pressure changes with respect to the electrical signal in the corresponding one or ones of the ink chambers 3_a_-3_e_ are shown in FIG. 3.

When the electrical signal as shown in FIG. 3(_a_) is applied to a selected one of the piezoelectric elements 12_a_-12_e_, the pressure in the corresponding one of the ink chambers 3_a_-3_e_ changes as shown in FIG. 3(_b_).

At a rise $T_1$ of the pulse, the internal volume of the corresponding ink chamber is abruptly reduced to raise the pressure in the corresponding ink chamber. The resulting pressure wave is propagated to the orifice connected to the corresponding ink chamber and the internal pressure of the corresponding ink chamber is immediately recovered.

When the electrical pulse signal terminates at $T_2$, the internal volume of the ink chamber now abruptly expands so that the internal pressure reaches a negative pressure, that is, a pressure lower than an atmospheric pressure.

When a positive pressure, that is, a pressure higher than the atomospheric pressure in the selectively actuated ink chamber reaches the orifice connected to the ink chamber, the ink particle 15 is ejected from the orifice and the pressure wave decays. Thereafter, the ink 13 in the orifice is instantly pulled into the nozzle head 1 by the negative pressure and the pressure wave is reflected back into the ink chamber.

For example in Japanese Patent Application Laid-open No. 109935/1977 filed Dec. 7, 1976 and laid-open Sept. 14, 1977 and Japanese Patent Application Laid-open No. 64230/1977 filed Nov. 15, 1976 and laid-open May 27, 1977, the amount of pull-in of the ink into the nozzle head by the negative pressure is reduced to prevent the formation of small ink particle and the deflection of flying direction of the ink particle. However, it has been provided by an experiment that it is not effective to improve the frequency characteristic of the threshold voltage which the present invention intends. It is considered that the threshold voltage varies with the frequency because the reflected wave goes back to the ink chamber to cause the pulsation of the pressure in the ink chamber and the phase of the pulsation of the pressure in the ink chamber and the phase of the rise of the pressure pulse by the drive pulse are displaced with the frequency. Since the apparatus disclosed in the above-mentioned laid-open patent applications are not effective to prevent the pulsation, they are not effective to improve the frequency characteristic of the threshold voltage.

In accordance with one embodiment of the present invention, as shown in FIG. 4, a second or sub-pulse signal $P_2$ is applied to the selected piezoelectric element a predetermined time interval after a first or main pulse $P_1$, in a polarity to cancel out the pressure pulsation due to the reflected wave so that the variation of the pressure in the ink chamber is reduced to thereby improve the frequency characteristic of the threshold voltage. The main pulse $P_1$ induces the rise of the internal pressure of the ink chamber and the sub-pulse $P_2$ applied $\Delta T$ after the main pulse $P_1$ suppresses the pressure pulsation due to the reflected negative pressure wave.

By properly selecting the parameters such as a voltage $V_1$ and a pulse width $W_1$ of the main pulse $P_1$, a voltage $V_2$ and a pulse width $W_2$ of the sub-pulse $P_2$ and the delay time $\Delta T$, the frequency characteristic of the nozzle head is improved as will be described below.

FIG. 5 is for explaining the frequency characteristics of the nozzle head 1 in the case where a pair of main and sub-electrical pulse signal $P_1$ and $P_2$ are applied to a selected piezo-electric element. According to the embodiment of the invention and in the case where a single pulse signal is applied as in the conventional technique.

In the case where a single electrical pulse signal is applied to the nozzle head 1, the threshold voltage significantly varies with the frequency as shown be a solid line curve (I), and in the case where a set of the main pulse $P_1$ and the sub-pulse $P_2$ are applied with the delay time $\Delta T$ being equal to 120 microseconds, the variation of the threshold voltage with the frequency is small as shown by a dot-and-dash line curve (II) and, thus, the threshold voltage versus frequency characteristic is substantially flat and stable over a large frequency range. A broken line curve (III) shows the frequency characteristic in the case where the delay time $\Delta T$ is selected to be 50 microseconds. In the last case, it has been found that the variation of the threshold voltage is rather larger than that in the conventional case where a single pulse is applied. This is because the sub-pulse signal $P_2$ is applied before the pressure wave caused by the main pulse signal $P_1$ and reflected back from the orifice has reached the ink chamber again so that the pulsation due to the reflected wave by the main pulse signal $P_1$ and the pulsation due to the reflected wave by the sub-pulse signal $P_2$ are always produced in the ink chamber and they adversely affect the pressure change in the ink chamber.

Accordingly, it is necessary to set the delay time $\Delta T$ between the pair of main and sub-electrical pulse signals applied to the selected piezoelectric element to a proper duration. It has been found that by selecting the delay time $\Delta T$ to $$\Delta T \approx \Delta t_1 + 2\Delta t_2,$$

where $\Delta t_1$ is the pulse width (represented in time) of the main electrical pulse signal $P_1$, and $\Delta t_2$ is a propagation time of the pressure from the ink chamber to the orifice and therefore expressed by $\Delta t_2 = L/C$, L being an effective length from the ink chamber to the orifice, C being a sound velocity in the ink, the pulsation of the pressure in the ink chamber due to the reflected wave by the main electrical pulse signal $P_1$ is cancelled by the sub-electrical pulse signal $P_2$ so that a stabilized ink particle is ejected from the orifice.

In the present embodiment the ink particle of proper size can be ejected at a frequency of 5000 Hz or higher, while in the prior art single pulse system, the frequency limit for the ejection of the ink particle without adjusting the magnitude of the electrical pulse signal is 3000 Hz.

FIG. 6 shows a block diagram of an information signal source circuit for driving the nozzle head. An output pulse $P_{01}$ from a signal pulse generator 21 is applied to a pulse width adjuster 24 which produces the main pulse $P_1$ having a pulse width $W_1$. The output pulse $P_{01}$ of the pulse generator 21 is also supplied to a delay circuit 22 which produces a pulse $P_{02}$ which is delayed by $\Delta T$ from the pulse $P_{01}$. The pulse $P_{02}$ is supplied to a pulse width adjuster 25 which produces the sub-pulse $P_2$ having a pulse width $W_2$. The output pulses $P_1$ and $P_2$ from the pulse width adjusters 24 and 25 are combined in an adder 27 and the combined pulse signal is applied to selected one or ones of the piezoelectric elements 12a–12e through an amplifier 28. A relation of the pulse width $W_2$ of the sub-pulse $P_2$ to the pulse width $W_1$ of the main pulse $P_1$ is experimentarily determined. In the present embodiment, the voltages $V_1$ and $V_2$ of the main pulse $P_1$ and the sub-pulse $P_2$ are equal. Alternatively, an amplifier may be inserted at a point A, B or C in the sub-pulse generation circuit so that the voltage $V_2$ of the sub-pulse $P_2$ is changed relative to the voltage $V_1$ of the main pulse $P_1$.

FIG. 7 is a plan view, partly cut away, of a nozzle head in accordance with another embodiment of the present invention. The like numerals to those shown in FIG. 1 denote the like elements and hence they are not explained here. Although only a set of orifice, ink chamber and piezoelectric element is shown for the purpose of simplification, the other sets may be constructed in the same manner. Between the ink supply aperture 8 of the nozzle head 1 and the first ink chamber 3a (3b–3e), a second ink chamber 17a (17b–17e) is formed to define a second pressure chamber in series with the first ink chamber 3a (3b–3e) and a second piezoelectric element 18a (18b–18c) is joined on the upper surface of the upper cover 11 at the position corresponding to the second ink chamber 17a (17b–17e).

A pre-electrical pulse signal $P_3$ which preceeds to the main electrical pulse $P_1$ applied to the piezoelectric element 12a (12b–12e) corresponding to the first ink chamber 3a (3b–3e) for injecting the ink particle 15, by a predetermined time interval $\Delta T'$, is applied to the second piezoelectric element 18a (18b–18e) corresponding to the second ink chamber 17a (17b–17e).

FIG. 8 shows a block diagram of an information signal source circuit for driving the nozzle head shown in FIG. 7. In this circuit, a pre-pulse signal generating circuit is added to the main and sub-pulse signal circuit shown in FIG. 6. The main pulse $P_1$ and the sub-pulse $P_2$ are generated in the same manner as shown in FIG. 6, and the like numerals denote the like elements.

The additional pre-pulse signal generating circuit includes a pulse advance circuit 23, a pulse width adjuster 26 and an amplifier 29. The output pulse $P_{01}$ from the pulse generator 21 is supplied to the pulse advance circuit 23 which produces a pulse $P_{03}$ advanced by $\Delta T'$ from the pulse $P_{01}$. The pulse $P_{03}$ is supplied to the pulse width adjuster 26 which produces the pre-pulse $P_3$ having a pulse width $W_3$ which in turn is applied to the second piezoelectric element 18*a* (18*b*–18*e*) of the second ink chamber 17*a* (17*b*–17*e*) through the amplifier 29. A voltage $V_3$ of the pre-pulse $P_3$ may be varied by the amplifier 29.

In the apparatus of the present embodiment, when the pre-pulse signal $P_3$ is applied to the piezoelectric element 18*a* (18*b*–18*e*) of the second ink chamber 17*a* (17*b*–17*e*), a pressure wave is produced in the second ink chamber 17*a* (17*b*–17*e*). By applying the main pulse signal $P_1$ to the piezoelectric element 12*a* (12*b*–12*e*) of the first ink chamber 3*a* (3*b*–3*e*) when a wave front of the pressure wave reaches the first ink chamber 3*a* (3*b*–3*e*), the rise of the pressure in the ink chamber 3*a* (3*b*–3*e*) is rendered sharp. As a result, the magnitude of the main pulse signal $P_1$ applied to the piezoelectric element 12*a* (12*b*–12*e*) of the first ink chamber 3*a* (3*b*–3*e*), and hence the threshold voltage for ejecting the ink particle 15 from the orifice 4*a* (4*b*–4*e*) may be lowered.

Since the pressure change in the second ink chamber 17*a* (17*b*–17*e*) is superimposed on the pressure change in the first ink chamber 3*a* (3*b*–3*e*), the pulsation in the ink chamber 3*a* (3*b*–3*e*) is enhanced. This pulsation, however, can be suppressed by applying the subpulse signal $P_2$ to the piezoelectric element 12*a* (12*b*–12*e*) of the first ink chamber 3*a* (3*b*–3*e*). Thus, as a whole, the nozzle head having a low threshold voltage and less pulsation of the pressure in the ink chamber can be provided.

Since the electrical signal applied to the piezoelectric element may be low, the control is facilitated, and the printing apparatus having a low threshold voltage for injecting the ink particle and capable of forming a uniform ink particle over a wide frequency range can be provided.

The pulse width $W_3$, the voltage $V_3$ and the advance time $\Delta T'$ of the pre-pulse signal $P_3$ can be experimentarily determined.

While the plurality of second ink chambers 17*a*–17*e* are arranged in series with the first ink chambers 3*a*–3*e*, respectively, which inject the ink particles in the present embodiment, the second ink chambers may be a common ink chamber like in the first embodiment and a single piezoelectric element may be arranged in the common ink chamber so that an initial pressure wave is transmitted therefrom to the respective ink chambers. In this modification, there is no need to provide separate second ink chambers and hence the structure of the nozzle head is simplified.

As is well known, when characters or symbols are printed by the ink jet printing apparatus having the nozzle head constructed as shown in FIG. 1, the ink particles are selectively ejected from the vertically arranged orifices 4*a*–4*e* of the nozzle head 1 while the head is laterally moved to serially print out the characters, as shown in FIG. 9. While five orifices are shown in FIG. 1, seven orifices may by used to define a seven-dot column as seen in FIG. 9. By laterally shifting the head five times, a 7×5 dot matrix character or symbol can be printed out. Generally, in the 7×5 dot matrix system, a two dot space is inserted between every two adjacent characters or symbols.

When the respective numbers of dots in vertical and horizontal directions of the matrix are given by A and B, respectively, the horizontal space is given by B' dots, the printing speed is given by C characters per second, and the drive frequency for the nozzle head is given by f cycles, the following relation is met:

$$f = C \times \overline{B} \qquad (1)$$

where $$\overline{B} = B + B' \qquad (2)$$

FIG. 10 shows a chart of the threshold voltage versus the frequency of the proper particle formation limit voltage. A solid line curve P shows a frequency characteristic of the threshold voltage when a set of main and sub-pulses are applied in accordance with the embodiment of the present invention, and a curve Q shows a frequency characteristic of the proper particle formation limit voltage. A dot-and-dash line curve P' shows a frequency characteristic of the threshold voltage when a single pulse in the prior art system is applied and a curve Q' shows the frequency characteristic of the proper particle formation limit voltage.

As seen from FIG. 10, the variations of the threshold voltage P and the proper particle formation limit voltage Q in the present embodiment are less than those of P' and Q' in the prior art system. This trend is particularly remarkable in the frequency characteristic of the threshold voltage. Also as seen from FIG. 10, the response frequency limit $f_b$ in the present embodiment is higher than the response frequency limit $f_a$ in the prior art single pulse system, and a frequency range R for the proper particle formation limit voltage exist in a high frequency region. However, while the response frequency limit is expanded by the double pulse drive in accordance with the present embodiment, the threshold voltage and the proper particle formation limit voltage significantly vary in a certain frequency region (around 2 KHz) as shown in FIG. 10. It has been found that if the frequency range of the proper particle formation limit voltage is in a high frequency region in which the nozzle head drive frequency f meets the relations described below, the high frequency region may be used to drive the nozzle head.

$$\frac{\overline{B}}{n} \cdot f_1 > f > \frac{\overline{B}}{n+1} \cdot f_2 \qquad (3)$$

$$\overline{B} \geqq \frac{f_2}{f_2 - f_1} \qquad (4)$$

$$f \leqq f_{max} \qquad (5)$$

where $f_1$ and $f_2$ are lowest and highest frequencies, respectively, of a frequency region in which there is no frequency range of the proper particle formation limit voltage, $f_{max}$ is an upper limit frequency of the frequency range R of the proper particle formation limit voltage, and n is a positive integer where $$0 < n \leqq \overline{B} - 1 \qquad (6)$$

If the frequency f which meets the above requirements is attained, the maximum operating frequency can be determined within that frequency range of the frequency f.

A specific example of the frequencies used in the high speed ink jet printer in the present embodiment is now explained with reference to FIG. 10. In the case where the frequency characteristics of the threshold voltage and the proper particle formation limit voltage are substantially constant under 2000 Hz so as to allow a frequency range of proper particle formation to exist, they significantly vary between 2000–2300 Hz so as to allow no frequency range of proper particle formation to exist, and they are again stabilized above 2300 Hz so as to allow another frequency range of proper particle formation to exist, the frequencies $f_1$ and $f_2$ are given by 2100 Hz and 2300 Hz, respectively. When the character is printed out by 7×5 dot matrix with the space of two dots, B=5, B'=2 and hence $\overline{B}=5+2=7$. Accordingly, the relations (3), (4) and (5) are represented as follows:

$$\frac{14700}{n} > f > \frac{16100}{n+1} \quad (7)$$

$$\overline{B} \leqq 11.5\ (\overline{B} = 7)$$

$$f \leqq 3500 \text{ Hz} \quad (8)$$

From the formulas (7) and (8), $$\frac{16100}{n+1} < 3500$$

$$n > 3.6$$

From the formula (6), $$n \leqq 6$$

$$n = 4, 5, 6$$

From the formula (7), when n=4, 3675>f>3220
when n=5, 2940>f>2683
when n=6, 2450>f>2300

In the present embodiment, the nozzle head drive frequency f is selected within those ranges as mentioned above. Accordingly, the affect of the frequency range from $f_1$ (2100 Hz) to $f_2$ (2300 Hz) is avoided and a high drive frequency can be selected to attain a stable and high speed print characteristic. When more than one poor frequency characteristic ranges exist in the frequency region lower than $f_1$, the proper frequency f is determined for each of the ranges and if a frequency region common to all of the frequencies f, the drive frequency can be set in the high frequency region without being affected by the plurality of poor frequency characteristic regions.

While the liquid injected from the nozzle head is ink and it is used to print the characters in the illustrated embodiments, the present invention is not limited to such specific embodiments but any liquid which can be formed into particles may be used, and it may be used for measurement or analysis. For example, a digital controlled micropipet for placing a small quantity of liquid into a vessel may be constructed.

We claim:

1. An ink jet printing apparatus comprising:

a nozzle head including at least one orifice means for ejecting ink particles, first ink chamber means having one end thereof communicated with said orifice means and the other end thereof communicated with an ink supply aperture to define a pressure chamber and first piezoelectric transducing means associated with said first ink chamber means for changing an internal volume of said first ink chamber means when actuated to eject the ink particles from said orifice means;

means for selectively applying a set of main and sub-electrical signal pulses to said first piezoelectric transducing means to actuate the same, said electrical pulse signal applying means including first means for generating said main electrical signal pulse for inducing a rise of a pressure wave in said first ink chamber means and second means for generating said sub-electrical signal pulse for suppressing the pulsation of pressure in said first ink chamber means, said sub-electrical signal pulse having a phase lagged by a predetermined time interval from said main electrical pulse signal;

second ink chamber means arranged between said first ink chamber means and said ink supply aperture and communicating therewith, and second piezoelectric transducing means associated with said second ink chamber means for changing an internal volume of said second chamber means when actuated; and said set of main and sub-electrical signal pulses further including a pre-electrical signal pulse to be applied to said second piezoelectric transducing means to actuate the same, and said electrical signal applying means includes third means for generating said pre-electrical signal a predetermined time interval prior to said main electrical signal pulse.

2. An ink jet printing apparatus according to claim 1, wherein in the case where a plurality of sets of said orifice means, said first ink chamber means, said second ink chamber means, said first piezoelectric transducing means and said second piezoelectric transducing means are provided, correspondingly respectively, said main and sub-electrical signal pulses are applied to selected one or ones of said plural first piezoelectric transducing means and said pre-electrical signal pulse is applied to the corresponding one or ones of said plural second piezoelectric transducing means.

3. An ink jet printing apparatus according to claim 1, wherein in the case where a plurality sets of said orifice means, said first ink chamber means and said first piezoelectric transducing means are provided, correspondingly respectively, only one said second ink chamber means is provided as second common ink chamber means, and only one said second piezoelectric transducing means is associated with said second common ink chamber means, and said main and sub-electrical signal pulses are applied to selected one or ones of said first piezoelectric transducing means and said pre-electrical pulse signal is applied to said only one second piezoelectric transducing means.

4. An ink jet printing apparatus according to claim 1, 2 or 3, wherein said electrical signal applying means comprises pulse signal generating means, first pulse width adjusting means connected to said pulse signal generating means for adjusting a pulse width of a pulse signal generated by said pulse signal generating means to produce said main electrical signal pulse, delay means connected to said pulse signal generating means for delaying a phase of said pulse signal generated by said pulse signal generator by said predetermined delay time, second pulse width adjusting means for adjusting a pulse width of an output pulse from said delay means to produce said sub-electrical signal pulse, advance means connected to said pulse signal generating means for advancing the phase of said pulse signal generated by said pulse signal generating means by said predetermined advance time, and third pulse width adjusting means for adjusting a pulse width of an output pulse from said advance means to produce said pre-electrical signal pulse.

5. An ink jet printing apparatus according to claim 4, wherein a maximum frequency f for driving said nozzle head, namely for applying the electrical pulse signal set, is selected to satisfy the following conditions $$\frac{\overline{B}}{n}\cdot f_1 > f > \frac{\overline{B}}{n+1}\cdot f_2$$

$$\overline{B} \geqq f_2/(f_2 - f_1), \text{ and}$$

$$f \leqq f_{max}$$

where $\overline{B}$ is the number of dots corresponding to a sum of a width of a unit dot matrix for representing a character to be printed and a space between two adjacent unit matrixes, $f_1$ and $f_2$ are lowest and highest frequencies, respectively, of an improper nozzle drive frequency range, namely an improper frequency range for applying the electrical pulse signal set, in which proper ink particle is not formed because of variation of relation between a threshold voltage of said main electrical pulse signal and a limit voltage for the formation of proper particle, $f_{max}$ is an upper limit frequency of a proper nozzle drive frequency range, namely a proper frequency range for applying the electrical pulse signal set, in which proper ink particle is formed at a frequency region higher than $f_2$, and n is an integer which meets $0<n\leqq\overline{B}-1$.

6. An ink jet printing apparatus comprising:

a nozzle head including at least one orifice means for ejecting ink particles, first ink chamber means having one end thereof communicated with said orifice means and the other end thereof communicated with an ink supply aperture to define a pressure chamber and first piezoelectric transducing means associated with said first ink chamber means for changing an internal volume of said first ink chamber means when actuated to eject the ink particles from said orifice means; and means for selectively applying a set of main and sub-electrical signal pulses to said first piezoelectric transducing means to actuate the same, said electrical pulse signal applying means including first means for generating said main electrical signal pulse for inducing a rise of a pressure wave in said first ink chamber means and second means for generating said sub-electrical signal pulse for suppressing the pulsation or pressure in said first ink chamber means, said sub-electrical signal pulse having a phase lagged by a predetermined time interval from said main electrical pulse signal, said predetermined time interval being set to be substantially equal to a sum of a pulse width of said main electrical signal pulse represented in a time unit and a time required for a pressure wave produced by the application of said main electrical signal pulse to said first piezoelectric transducing means, in said first ink chamber means, to reach said orifice means communicating with said first ink chamber means and to be reflected back to said first ink chamber means, said electrical signal applying means comprises pulse signal generating means, first pulse width adjusting means connected to said pulse signal generating means for adjusting a pulse width of a pulse signal generating by said pulse signal generating means to produce said main electrical signal pulse, delay means connected to said pulse signal generating means for delaying a phase of said pulse signal generated by said pulse signal generator by said predetermined delay time, and second pulse width adjusting means for adjusting a pulse width of an output pulse from said delay means to produce said sub-electrical signal pulse, and wherein a maximum frequency f for driving said nozzle head, namely for applying the electrical pulse signal set, is selected to satisfy the following conditions $$\frac{\overline{B}}{n}\cdot f_1 > f > \frac{\overline{B}}{n+1}\cdot f_2$$

$$\overline{B} \geqq f_2/(f_2 - f_1), \text{ and}$$

$$f \leqq f_{max}$$

where $\overline{B}$ is the number of dots corresponding to a sum of a width of a unit dot matrix for representing a character to be printed and a space between two adjacent unit matrixes, $f_1$ and $f_2$ are lowest and highest frequencies, respectively, of an improper nozzle drive frequency range, namely an improper frequency range for applying the electrical pulse signal set, in which proper ink particle is not formed because of variation of relation between a threshold voltage of said main electrical pulse signal and a limit voltage for the formation of proper particle, $f_{max}$ is an upper limit frequency of a proper nozzle drive frequency range, namely a proper frequency range for applying the electrical pulse signal set, in which proper ink particle is formed at a frequency region higher than $f_2$, and n is a positive integer which meets $0<n\leqq\overline{B}-1$.

7. An ink jet printing apparatus according to claim 6, wherein said electrical pulse signal applying means applies the electrical signal pulses over a large frequency range to said first piezoelectric transducing means to actuate the same and enable injection of the ink particles from said orifice means, said first generating means generating said main electrical signal pulse with a threshold value necessary for inducing a rise of a pressure wave in said first ink chamber means, and said second generating means generating said sub-electrical signal pulse phase lagged by a predetermined time interval from said main electrical signal pulse for suppressing the pulsation of pressure in said ink chamber means so as to enable the threshold value versus frequency characteristic of the ink jet printing apparatus to be substantially flat over a large frequency range.

* * * * *